Figure 1:
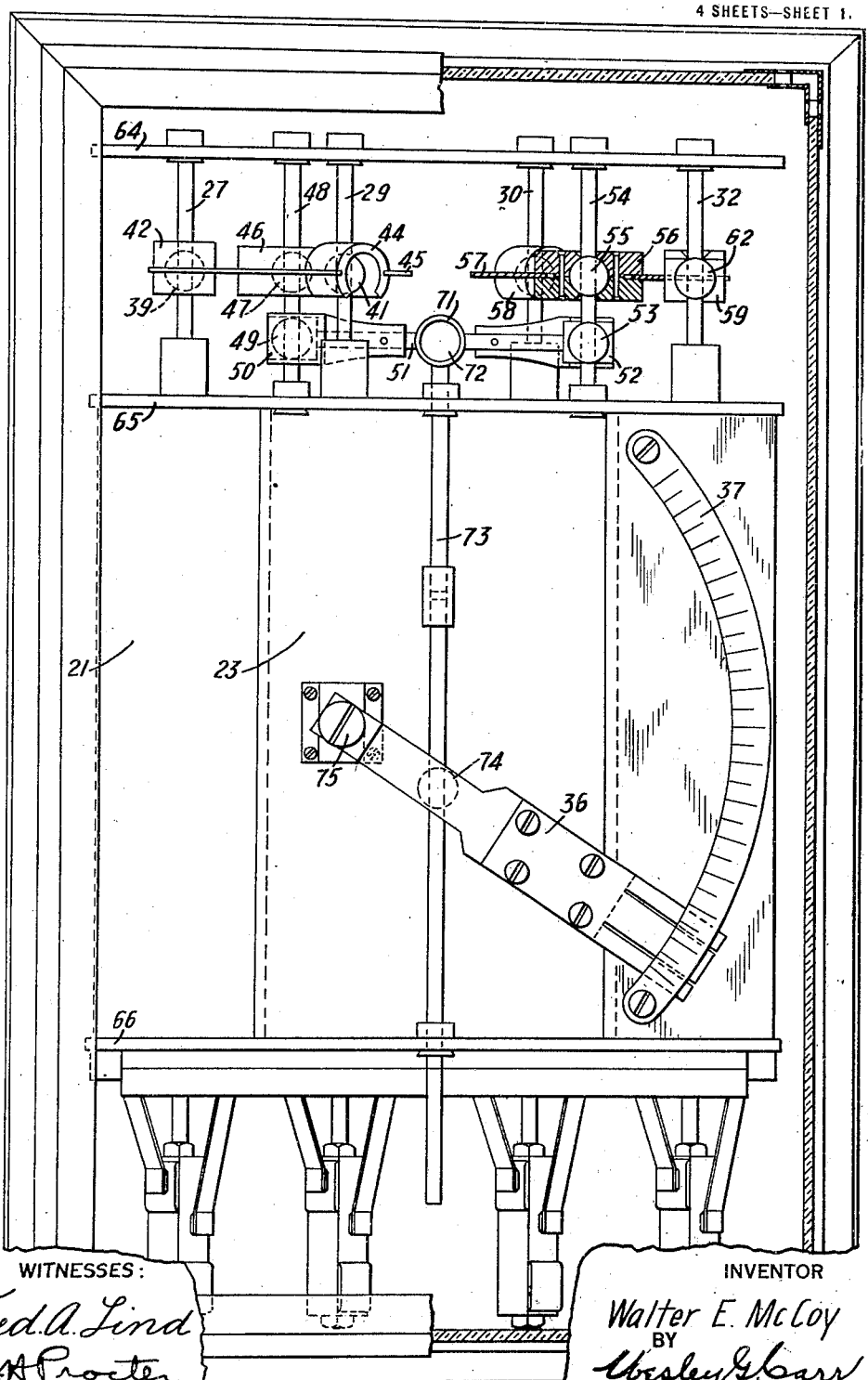

W. E. McCOY.
SUMMATING DEVICE.
APPLICATION FILED MAR. 25, 1916.

1,368,343.

Patented Feb. 15, 1921.
4 SHEETS—SHEET 1.

WITNESSES:
Fred. A. Lind
J. A. Procter

INVENTOR
Walter E. McCoy
BY
Wesley G. Carr
ATTORNEY

W. E. McCOY.
SUMMATING DEVICE.
APPLICATION FILED MAR. 25, 1916.

1,368,343.

Patented Feb. 15, 1921.
4 SHEETS—SHEET 3.

WITNESSES:

INVENTOR
Walter E. McCoy
BY
ATTORNEY

W. E. McCOY.
SUMMATING DEVICE.
APPLICATION FILED MAR. 25, 1916.

1,368,343.

Patented Feb. 15, 1921.
4 SHEETS—SHEET 4.

WITNESSES:
Fred. A. Lind.
J. A. Procter

INVENTOR
Walter E. McCoy
BY
Wesley G. Carr
ATTORNEY

UNITED STATES PATENT OFFICE.

WALTER E. McCOY, OF NEW YORK, N. Y., ASSIGNOR TO WESTINGHOUSE ELECTRIC & MANUFACTURING COMPANY, A CORPORATION OF PENNSYLVANIA.

SUMMATING DEVICE.

1,368,343.  Specification of Letters Patent.  Patented Feb. 15, 1921.

Application filed March 25, 1916. Serial No. 86,560.

*To all whom it may concern:*

Be it known that I, WALTER E. MCCOY, a citizen of the United States, and a resident of New York city, in the county of New York and State of New York, have invented a new and useful Improvement in Summating Devices, of which the following is a specification.

My invention relates to summating devices and particularly to devices that are adapted to combine a plurality of component forces or movements into a single resultant force or movement.

One object of my invention is to provide a device of the above indicated character that shall embody means for so mechanically connecting the movable members of a plurality of electro-responsive devices that their movements may be summated to actuate a single device in accordance with the number of electro-responsive devices that are operating.

Another object of my invention is to provide electro-responsive devices for a summating device of the above indicated character that shall have means for so locking their movable members in predetermined positions that, when they are inactive, they will not affect the movement of the other movable members of the summating device.

Copending U. S. application, Serial No. 850,329, filed July 11, 1914, by Paul Mac-Gahan and assigned to the Westinghouse Electric and Manufacturing Company, discloses a totalizing measuring instrument for recording the energy that traverses a plurality of circuits. When one of the circuits is rendered inactive, it is necessary to adjust a multiplier in order to obtain a record of maximum size on a record sheet of given size. In order to effect automatic operation of a totalizing measuring instrument of this type, I provide a summating device that is adapted to automatically adjust the multiplier in accordance with the number of circuits that are operating.

My invention may also be adapted to automatically control the voltage compensators of distributing systems having a plurality of parallel-connected circuits. Compensators are usually connected to the power station end of a circuit for determining the voltage at the other end of the circuit without the necessity of employing pilot conductors. In the usual form, compensators are substantially transformers having reactances and resistances corresponding in value and relation to the reactances and the resistances of the circuits. If only one circuit is compensated, it presents no difficulty. However, if a plurality of circuits are connected in parallel it is necessary to adjust the compensator each time one of the parallel circuits is switched in or out. My device is admirably adapted to automatically control a compensator of the above indicated type and is here described in connection with such a device. However, it may be applied equally well to other devices.

Figure 2:
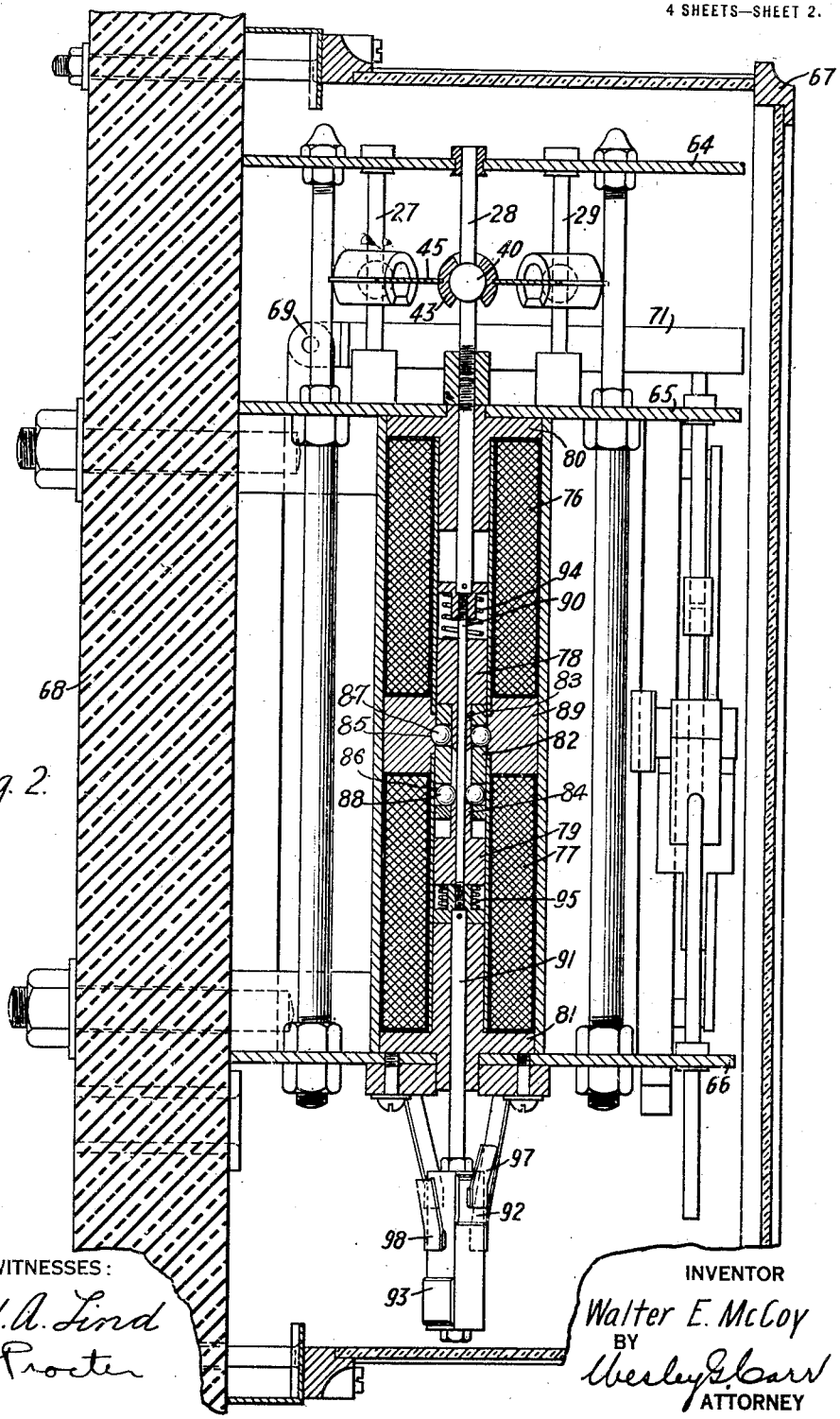
Figure 3:
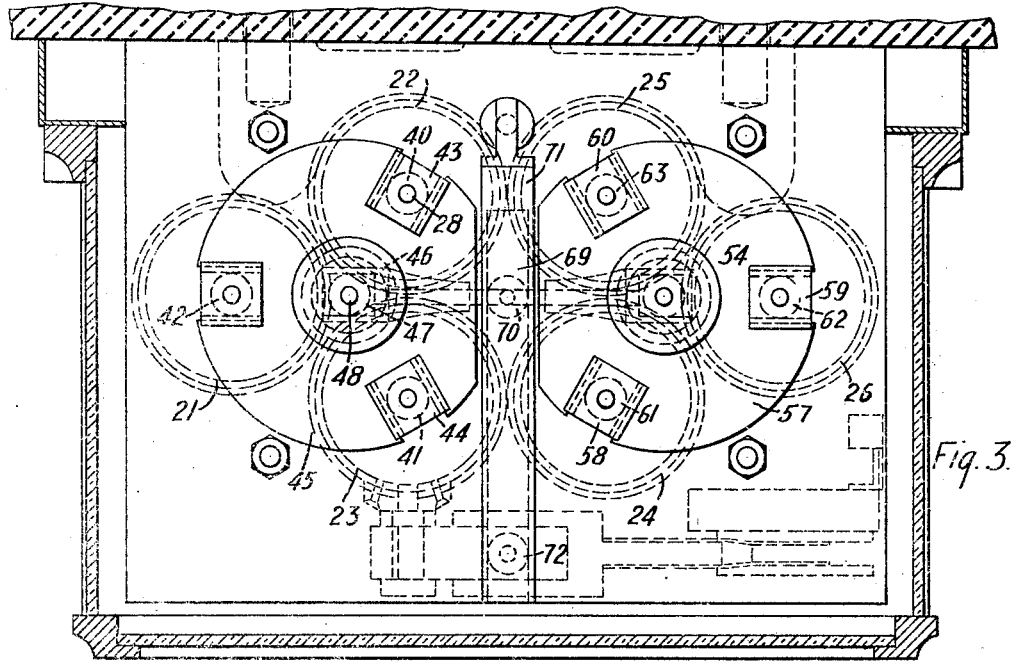
Figure 4:
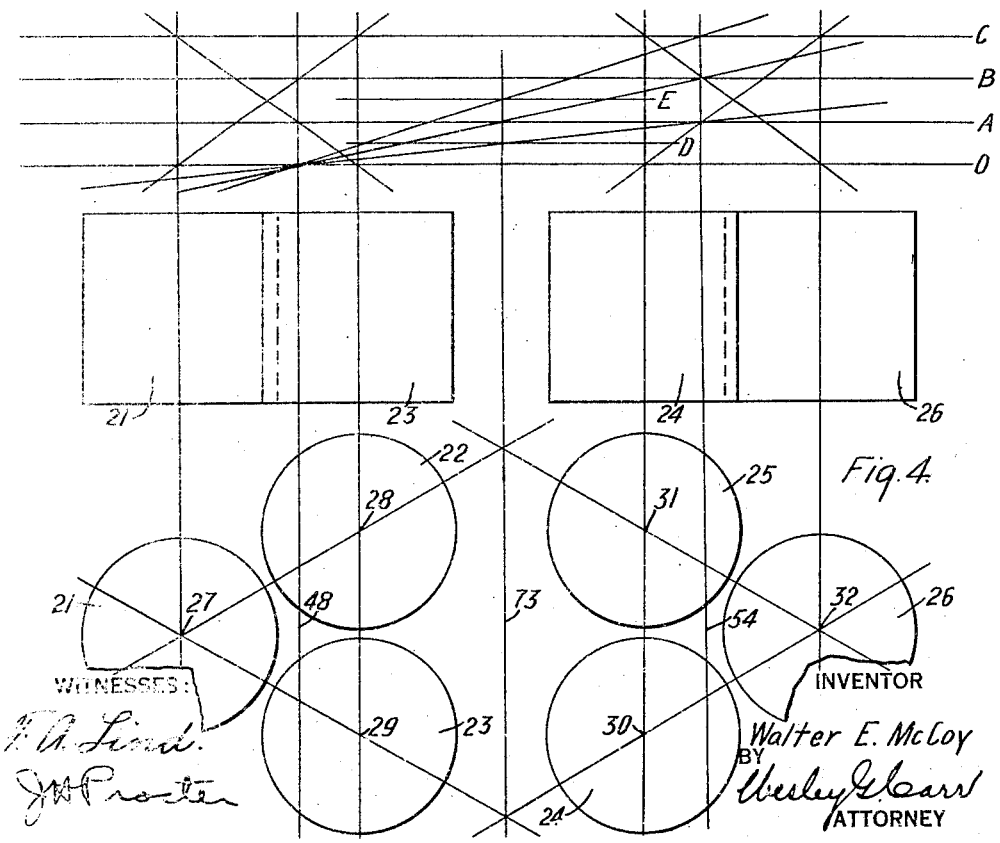
Figure 5:
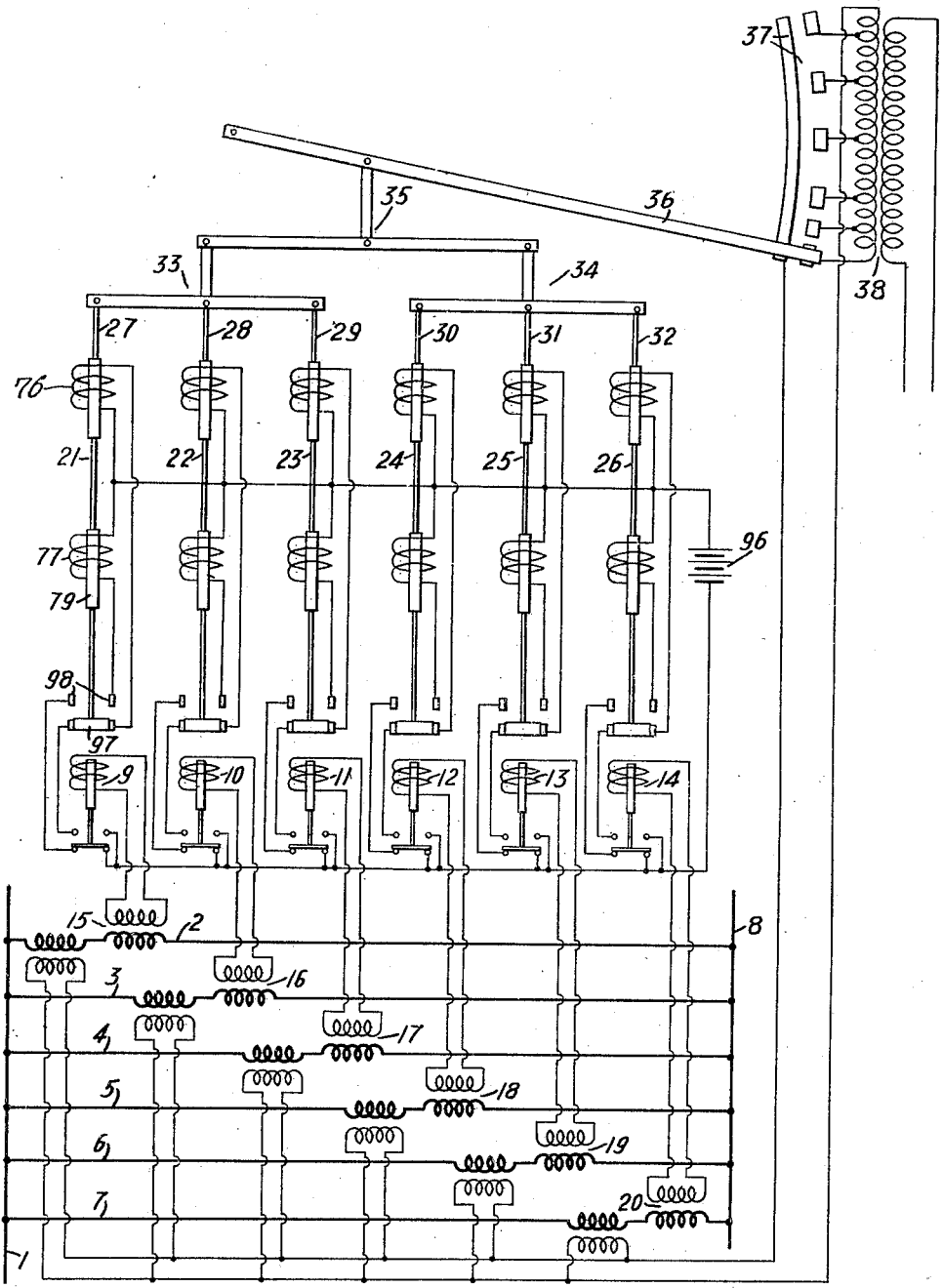

Figure 1 of the accompanying drawings is a front view, partially in elevation and partially in section, of a summating device embodying my invention; Fig. 2 is a side view, partially in elevation but mainly in section, of the summating device shown in Fig. 1; Fig. 3 is a top view, partially in plan and partially in section, of the device shown in Figs. 1 and 2; Fig. 4 is a diagram illustrating the various movements obtainable with a summating device embodying my invention, and Fig. 5 is a diagrammatic view of an electrical system that is provided with a summating device embodying my invention.

An electrical system, in connection with which my device may be employed, comprises a generating station bus-bar 1, a plurality of parallel-connected feeder circuits 2, 3, 4, 5, 6 and 7 and a sub-station bus-bar 8. Relay devices 9, 10, 11, 12, 13 and 14 are provided for the respective feeder circuits 2, 3, 4, 5, 6 and 7. The windings of the relay devices are connected to the secondary windings of transformers 15, 16, 17, 18, 19 and 20 the primary windings of which are connected in circuit with the conductors of the respective circuits 2 to 7 inclusive. The relays are adapted to control the operation of a plurality of electromagnetic devices 21, 22, 23, 24, 25 and 26, the respective movable members or rods 27, 28, 29, 30, 31 and 32 of which are arranged in groups of three movable members each, the movable members of each group being arranged equidistant with respect to each other. The electromagnetic devices 21, 22 and 23 constitute a group 33 and the electromagnetic devices 24, 25 and 26 constitute a second group 34. A universal linkage mechanism 35 is so connected to the movable members of the groups 33 and 34 that the movement of any one or any combination of movements of the movable members of the electromagnetic devices will impart a movement to a pivoted lever arm 36. The lever arm 36 is adapted to move a distance in accordance with the number of electromagnetic devices that are operating, and it may be adapted to engage a plurality of stationary contact members 37 for the purpose of controlling the voltage of a transformer 38. The secondary winding of the transformer 38 is operatively connected to a compensator (not shown) or any other desirable device. As shown in Fig. 5 of the drawings, the primary winding of the transformer 38 is supplied with energy from the circuits 2, 3, 4, 5, 6 and 7. However, these connections may be changed for different adaptations of my device.

Balls 39, 40 and 41 are mounted on the movable members or rods 27, 28 and 29 and are adapted to receive socket members 42, 43 and 44, respectively. The socket members are mounted on a plate 45 in which is disposed, at a central point, a socket member 46. A ball 47, that is mounted on a movable member or rod 48, is disposed in the socket 46, and a second ball 49, that is also mounted on the movable member 48 is disposed in a socket 50. The socket 50 is mounted on one end of a member 51 the other end of which is provided with a similar socket 52. A ball 53 is mounted on a movable member or rod 54 on which is also mounted a second ball 55. The ball 53 is adapted to be surrounded by the socket 52, and the ball 55 is adapted to be surrounded by a socket 56 that is operatively connected to the central portion of a plate 57. The plate 57 is provided with three equally spaced sockets 58, 59 and 60 that are adapted to receive balls 61, 62 and 63 which are mounted on the movable members or rods 30, 31 and 32, respectively.

The movable members or rods 27, 28, 29, 30, 31 and 32 are adapted to be slidably mounted and are guided by bearings located in plates 64, 65 and 66 that are mounted within a casing 67 and are secured to a panel board 68, substantially as shown in the drawings.

A ball 70 is mounted intermediate the ends of the movable member 51 and is surrounded by a tube 71 that is pivoted at one end 69. A ball 72 that is mounted on the upper end of a rod 73, is disposed in the outer end of the tube 71 and constitutes a universal connection between the rod 73 and the tube 71. The rod 73 is connected, through a ball-and-socket joint 74, to the pivoted member 36. The member 36 is pivoted at 75 and is adapted to engage the contact members 37, substantially as hereinbefore set forth.

Each of the electromagnetic devices 21, 22, 23, 24, 25 and 26 comprises a winding 76, a winding 77, a movable core member 78 for the winding 76, a movable core member 79 for the winding 77, stationary core members 80 and 81 and a third magnetizable movable member 82. The magnetizable member 82 is adapted to loosely surround the chamfered portions 83 and 84 of the movable core members 78 and 79, respectively, and is provided with openings 85 and 86 to receive two sets of balls 87 and 88. A non-magnetizable member 89 is disposed between the two windings 76 and 77 and is provided with openings or recesses to receive the balls 87 and 88, under predetermined conditions. Rods 90 are connected to the lower ends of the movable members or rods 27, 28, 29, 30, 31 and 32, and rods 91, that carry movable bridging contact members 92 and 93, are attached to the lower ends of the rods 90. Springs 94 are disposed between the lower ends of the rods 27, 28, 29, 30, 31 and 32 and the upper ends of the movable core members 78, and springs 95 are disposed between the lower ends of the rods 90 and the lower ends of the movable core members 79. The movable core members 78, 79 and 82 are adapted to loosely surround the rods 90. The tips of the portions 83 and 84 of the movable core members are so shaped that, when they are withdrawn from the openings in the core member 82, the balls 87 and 88 will be permitted to move toward the rod 90 from the recesses in the member 89.

If the circuit 2 is traversed by energy and no energy traverses the other circuits, the movable core member of the relay 9 will move upwardly to complete a circuit from a source of electromotive force 96 through the winding 76 of the electromagnetic device 21. When the winding 76 is energized, the movable core member 78 will move upwardly to compress the spring 94 and permit the balls 87 to withdraw from the recesses in the member 89. When the spring 94 is sufficiently compressed, the movable member 27 will move upwardly and will transmit its movement to the movable core members 79 and 82 through the spring 95. The upward movement of the rod 90 causes the contact members 92 that are mounted on the lower end of the rod 91 to be disengaged from the stationary contact members 97 and to engage stationary contact members 98. However, the contact members 92 are of such size that the contact members 97 will remain in engagement a sufficient time to permit the movable core member 82 to move to such position that the balls 88 will occupy a position substantially the same as is occupied by the balls 87 shown in Fig. 2 of the drawings.

The ball locks are provided to permit a definite upward movement of the rods 27 to 32, inclusive, when energy traverses their respective circuits, and they are locked in their uppermost position, as well as in their lowermost position, to prevent the movement of the movable member of an inactive electromagnetic device. This may be seen by assuming that the circuits 3 and 4 are operating and the circuit 2 is not operating; then, if the movable member 27 were not locked in its lowermost position, it would rise when the movable members 28 and 29 rose, and the resultant movement of the lever arm 36 would not be in accordance with the number of active electromagnetic devices.

When a circuit, for example, circuit 2, is rendered inactive, the movable core member of the relay 9 will move downwardly to complete a circuit from the battery 96 through the winding 77 of the electromagnetic device 21. This will cause the movable core member 79 to move downwardly to release the balls 88 from the recesses in the member 89, and will sufficiently compress the springs 94 and 95 to cause the movable members 27, 78 and 82 to also move downwardly. The downward movement of the rod 90 causes the stationary contact members 98 to be disengaged from the movable contact members 93 a sufficient time after the winding 77 is energized to permit a positive downward movement of the movable members to be obtained. Of course, the balls 87 return to the recesses in the member 89, and the electromagnetic device 21 is locked in its inactive position. The operation, as set forth with respect to electromagnetic device 21, may be duplicated in any one or more of the electromagnetic devices.

It will be understood that the lever arm 36 is adapted to move in accordance with a number of active electromagnetic devices. That is, if the circuit 2 and, consequently, the electromagnetic device 21, are operating alone, the member 27 will move upwardly carrying the plate 45 which, in this instance, is pivoted around the balls 40 and 41. The movement of the plate 45 will be transmitted through the socket 46, the ball 47, the rod 48, the ball 49, the socket 50 and the member 51 to the ball 70. The movement of the ball 70 is transmitted through the tube 71 and the ball 72 to the rod 73, which, in turn, transmits its movement through the ball-and-socket connection 74 to the lever arm 36. If any number of circuits are operating, the device will be similarly operated with the exception that the movements will be greater. That is, if all of the circuits 2 to 7, inclusive, are operating, the lever arm 36 will move to such position that only 16⅔ per cent. compensation is obtained, or, in other words, it will move to the uppermost contact member. If five circuits are operating, it will move to the next highest contact member and 20 per cent. compensation will be obtained. Thus, if any four, three, two or one circuits are operating, the member 36 will move to such position that 25%, 33⅓%, 50% and 100% compensation, respectively, is obtained. Sixty-three combinations may be obtained with the six electromagnetic devices. In other words, any one of the six circuits may be operated, any two, any three, any four and any five of the six circuits may be operated at one time.

Referring to Fig. 4 of the drawings, it will be seen that, if the rod 32 is moved upwardly from the line indicated by zero to the line "C," the rod 54 will be moved from the zero line to the line "A." Likewise, if the rods 30 and 31 are moved upwardly, the same amount, or from the zero line to line "C," the rod 54 will be moved from the zero line to line "B" or twice the distance that it would be moved if the rod 32 was moved alone. Further, if the rods 30, 31 and 32 are all moved, the rod 54 will be moved from the zero line to the line "C" or three times the distance that it would be moved if any one of the three rods were moved at one time. If the six movable rods are connected together, the rod 73 will be moved in accordance with the movement of the number of electromagnets that are operating. That is, if the rod 54 is moved from the zero line to the line "A," because of the movement of one rod in the groups 33 or 34, the rod 73 will be moved from the zero line to the line "D." Likewise, if the rod 54 is moved from the zero line to the line "B" when any two rods of the group 34 are moved, the rod 73 will be moved from the zero line to line "A." Also, if the rod 54 is moved from the zero line to the line "C," all three rods 30, 31 and 32 must be moved and the rod 73 will move to the line "E." If rods 48 and 54 are both moved from the zero line to line "A," the rod 73 will also be moved to the line "A." If the rod 48 is moved from the zero line to the line "B," the rod 73 will be moved to the line "A," and, if the rod 48 is moved to the line "C," the rod 73 will be moved to the line "E." Thus, since the movement of the rod 32 from the zero line to line "C" causes the rod 54 to move to the line "A," the rod 73 will be moved to the line "D" or only one sixth of the distance between the zero line and the line "C."

It will be understood that my invention is not limited to the specific structure illustrated, as many modifications may be made therein without departing from the spirit and scope of the invention as set forth in the appended claims.

I claim as my invention:

1. A summating device comprising a plurality of actuating devices, an actuated device connected thereto with a universal connection and means for so preventing movement of the inactive actuating devices that the actuated device shall be moved a distance corresponding to the number of active actuating devices.

2. In a summating device, the combination with a plurality of actuating devices and ball-and-socket universal means for connecting the same together, of means for so preventing movement of the inactive actuating devices that the connecting means shall be moved a distance proportional to the number of active actuating devices.

3. In a summating device, the combination with a plurality of movable members and means for actuating the same, of positive universal connecting means for securing the movable members together, and means for so holding the inactive movable members in their normal positions that the connecting means is adapted to be moved a distance corresponding to the number of active movable members.

4. In a summating device, the combination with three electromagnets having movable members arranged equidistant with respect to each other and means for connecting the movable members together, of means for so locking the inactive movable members that the connecting means shall be moved a distance corresponding to the number of active electromagnets.

5. In a summating device, the combination with three electromagnets having movable members arranged equidistant with respect to each other and means for connecting the movable members together, of means for so locking the inactive movable members that the movement of the connecting means shall correspond to the number of active electromagnets operating.

6. A summating device comprising a plurality of movable members, means for actuating the same, means comprising a universal joint for connecting the movable members together and means for so restraining the movement of the inactive movable members that the connecting means is moved in proportion to the number of active movable members.

7. The combination with a plurality of movable members and means for actuating the same, of universal joints for operatively connecting the movable members together, an actuated device operatively connected to the connecting means, and means for so locking the inactive movable members that the actuated device shall be moved a distance corresponding to the number of active movable members.

8. The combination with a plurality of movable members and means for actuating the same, of an actuated device connected through a positive universal connection to the movable members, and means for so locking the inactive movable members that the actuated device shall be moved a distance corresponding to the number of active movable members.

9. The combination with a plurality of movable members and electro-responsive means for actuating the same, of an actuated device connected to the movable members through a positive universal connection, and means for so holding the movable members of the inactive electro-responsive means that the actuated device shall be moved a distance corresponding to the number of active electro-responsive means.

10. The combination with a plurality of electro-responsive devices having movable members, of universal means for operatively connecting the movable members of the said devices together, and means for so normally holding the electro-responsive devices in one position that the connecting means shall be moved a distance corresponding to the number of active electro-responsive devices.

11. The combination with a plurality of electro-responsive devices having movable members, of means for operatively connecting the movable members of the said devices together, an actuated device operatively connected to the connecting means, and means for so locking the inactive electro-responsive devices that the actuated device shall be moved a distance corresponding to the number of active electro-responsive devices.

12. A summation device comprising a plurality of electromagnets, universal connections for operatively connecting the movable members together, an actuated device operatively connected to the universal connections and a ball-locking means for so locking the movable members of the inactive electromagnets that the actuated device shall be moved a distance corresponding to the number of active electromagnets.

13. A summation device comprising three movable members, universal means for operatively connecting the movable members together, an actuated device operatively connected to the connecting means, means for moving the movable members in one direction, means for moving the movable members in the opposite direction and means for locking them in predetermined positions.

14. In an electric system, the combination with a plurality of electric circuits, of a plurality of movable members, universal means for operatively connecting the movable members together, an actuated device operatively connected to the connecting means, means connected to the circuits for actuating the movable members in both directions, and means for locking the movable members under predetermined conditions.

15. An electromagnetic device comprising a movable member, two movable core members, resilient means for operatively connecting the core members together and to the movable member, a stationary core member, magnet windings for the respective movable core members and means for locking the movable member in predetermined positions.

16. An electromagnetic device comprising a movable member, two movable core members, resilient means for operatively connecting the core members together and to the movable member, a stationary core member, two magnet windings for the respective movable core members and ball locks coöperating with the stationary core member to lock the movable member in predetermined positions.

17. An electromagnetic device comprising a movable member, two movable core members, resilient means for operatively connecting the core members together and to the movable member, means for actuating the core members and means for locking the movable member in predetermined positions.

18. An electromagnetic device comprising a movable member, two movable core members, resilient means for operatively connecting the core members together and to the movable member, means for actuating the core members and ball locks for restraining the movable member in predetermined positions.

19. An electromagnetic device comprising a movable member, two movable core members, resilient means for operatively connecting the core members to the movable member, and means for locking the movable member and dependent upon the relative movement of the core members with respect to the movable member for unlocking the same.

In testimony whereof I have hereunto subscribed my name this 11th day of March, 1916.

WALTER E. McCOY.